United States Patent
Ghosh et al.

(10) Patent No.: US 10,609,164 B2
(45) Date of Patent: Mar. 31, 2020

(54) SYSTEM AND METHOD FOR DIAGNOSING AN UNFAVORABLE MOBILE APPLICATION USER EXPERIENCE

(71) Applicant: International Business Machines Corporation, Armonk, NY (US)

(72) Inventors: Rahul Ghosh, Morrisville, NC (US); Aaron J. Quirk, Ferry Ln., NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 14/884,898

(22) Filed: Oct. 16, 2015

(65) Prior Publication Data
US 2017/0109004 A1 Apr. 20, 2017

(51) Int. Cl.
G06F 3/0484 (2013.01)
H04L 29/08 (2006.01)
G06F 11/34 (2006.01)
G06F 17/40 (2006.01)

(52) U.S. Cl.
CPC ......... *H04L 67/22* (2013.01); *G06F 11/3438* (2013.01); *G06F 11/3452* (2013.01); *G06F 11/3476* (2013.01); *G06F 17/40* (2013.01)

(58) Field of Classification Search
None
See application file for complete search history.

(56) References Cited

U.S. PATENT DOCUMENTS

| | | | |
|---|---|---|---|
| 8,499,063 B1* | 7/2013 | Satish | G06F 8/62 709/220 |
| 8,701,125 B2 | 4/2014 | Pillers | |
| 2003/0066055 A1* | 4/2003 | Spivey | G06F 11/28 717/131 |
| 2010/0161506 A1 | 6/2010 | Bosenick et al. | |
| 2011/0047594 A1 | 2/2011 | Mahaffey et al. | |
| 2014/0019228 A1 | 1/2014 | Aggarwal et al. | |
| 2014/0132190 A1* | 5/2014 | Kitano | B60L 3/003 318/400.22 |
| 2014/0372803 A1* | 12/2014 | Park | G06F 11/079 714/37 |
| 2016/0201446 A1* | 7/2016 | Anghelescu | E21B 44/00 702/9 |

OTHER PUBLICATIONS

Flurry.com, "Messaging Apps: The New Face of Retail Banking", http://blog.flurry.com/?Tag=User+Retention; retrieved Apr. 8, 2016; 2 pages.

(Continued)

*Primary Examiner* — Tuan S Nguyen
(74) *Attorney, Agent, or Firm* — Cantor Colburn LLP; Alexander Jochym

(57) ABSTRACT

In some aspects, a computer-implemented method for diagnosing an unfavorable mobile application user experience is described. The method may include retrieving user application interaction data from a mobile device, inter-correlating the user application interaction data, updating a user interaction database with the inter-correlated user application data, and diagnosing, via a processor operatively connected to the user interaction database, information indicative of a cause of the unfavorable user experience.

12 Claims, 6 Drawing Sheets

(56) References Cited

OTHER PUBLICATIONS

Google.com, "Add Analytics to Your iOS App", https://developers.google.com/analytics/devguides/collection/ios/; retrieved Apr. 8, 2016; 3 pages.

Localytics.com, "Real-Time Insight so You Can Act Faster and Grow Faster", http://www.localytics.com/productfeatures/real-time-engagement-analysis/; retrieved Apr. 6, 2016; 7 pages.

\* cited by examiner

An example of Interface State Graph

An example of a User Action Graph

SYSTEM AND METHOD FOR DIAGNOSING AN UNFAVORABLE MOBILE APPLICATION USER EXPERIENCE

BACKGROUND

The present disclosure relates to mobile application diagnostics, and more specifically, diagnosing an unfavorable mobile application user experience.

Many consumers prefer mobile applications ("apps") over a mobile version of websites. Smart phone users often respond quickly when it comes to evaluating the usefulness of a downloaded app. Many users may download the app from an application marketplace, try it, and if they find it unusable, not user-friendly, or the app does not serve their purpose they will immediately uninstall. Most business enterprises prefer that users be engaged with their enterprise-specific customized apps. Downloading an app and then quickly uninstalling not only lowers the user experience rating of the app but may also impact the business reputation of a company.

Understanding the root causes that eventually lead a user to uninstall an app may be of interest to business enterprises. There exists a long-felt need for systems and methods that provide an understanding of path(s) to an unfavorable application event (e.g., uninstall), which may facilitate the refinement process and increase the likelihood of customer satisfaction. Application rankings or customer feedback in the application marketplace may provide some insight to app developers with respect to user experience. However, user-initiated feedback processes can be subjective and may not provide all the information necessary to make required adjustments to the application. For example, a group of users may complain online about slow performance, but they may not give details about the area of the application that has caused dissatisfaction. Secondly, users may not take the time to provide feedback, and thus, the enterprise may not be aware that a problem exists. It may be beneficial to provide systems and methods for collecting definitive and quantitative usage information on key events that precede a user uninstallation of an app.

SUMMARY

According to some embodiments, a computer-implemented method for diagnosing an unfavorable mobile application user experience is described. The method may include retrieving user application interaction data from a mobile device, inter-correlating the user application interaction data, updating a user interaction database with the inter-correlated user application data, and diagnosing, via a processor operatively connected to the user interaction database, information indicative of a negative user experience.

According to other embodiments, a system for diagnosing an unfavorable mobile application user experience is described. The system may include a processor configured to retrieve user application interaction data from a mobile device, inter-correlate the user application interaction data, update a user interaction database with the inter-correlated user application data, and diagnose information indicative of a cause of the unfavorable user experience.

According to yet other embodiments, a non-transitory computer-readable medium is described. The computer-readable medium may be configured to store instructions executable by a processor to perform a method that may include retrieving user application interaction data from a mobile device, inter-correlating the user application interaction data, updating a user interaction database with the inter-correlated user application data, and diagnosing, via a processor operatively connected to the user interaction database, information indicative of a cause of the unfavorable user experience.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
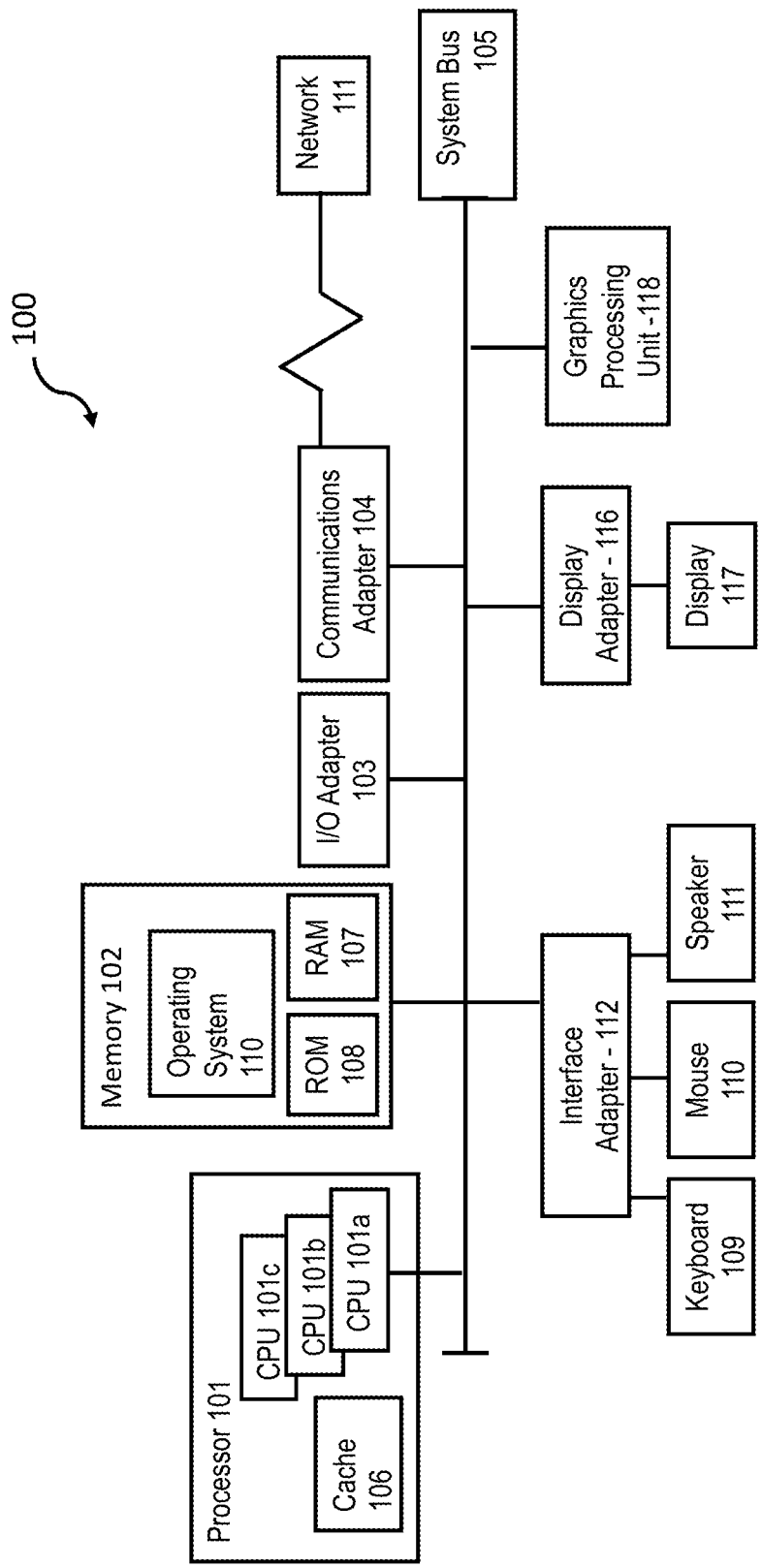
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices 109. Communications adaptor 104 may be operatively connect computer 100 to one or more networks 111. System bus 105 may also connect one or more user interfaces via interface adaptor 112. Interface adaptor 112 may connect a plurality of user interfaces to computer 100 including, for example, keyboard 109, mouse 110, speaker 111, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 113. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 111 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 111.

Network 111 can be an IP-based network for communication between computer 100 and any external device. Network 111 transmits and receives data between computer 100 and external systems. In an exemplary embodiment, network 111 can be a managed IP network administered by a service provider. Network 111 may be implemented in a wireless fashion, e.g., using wireless protocols and technologies, such as WiFi, WiMax, etc. Network 111 can also be a packet-switched network such as a local area network, wide area network, metropolitan area network, Internet network, or other similar type of network environment. The network 111 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 113, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
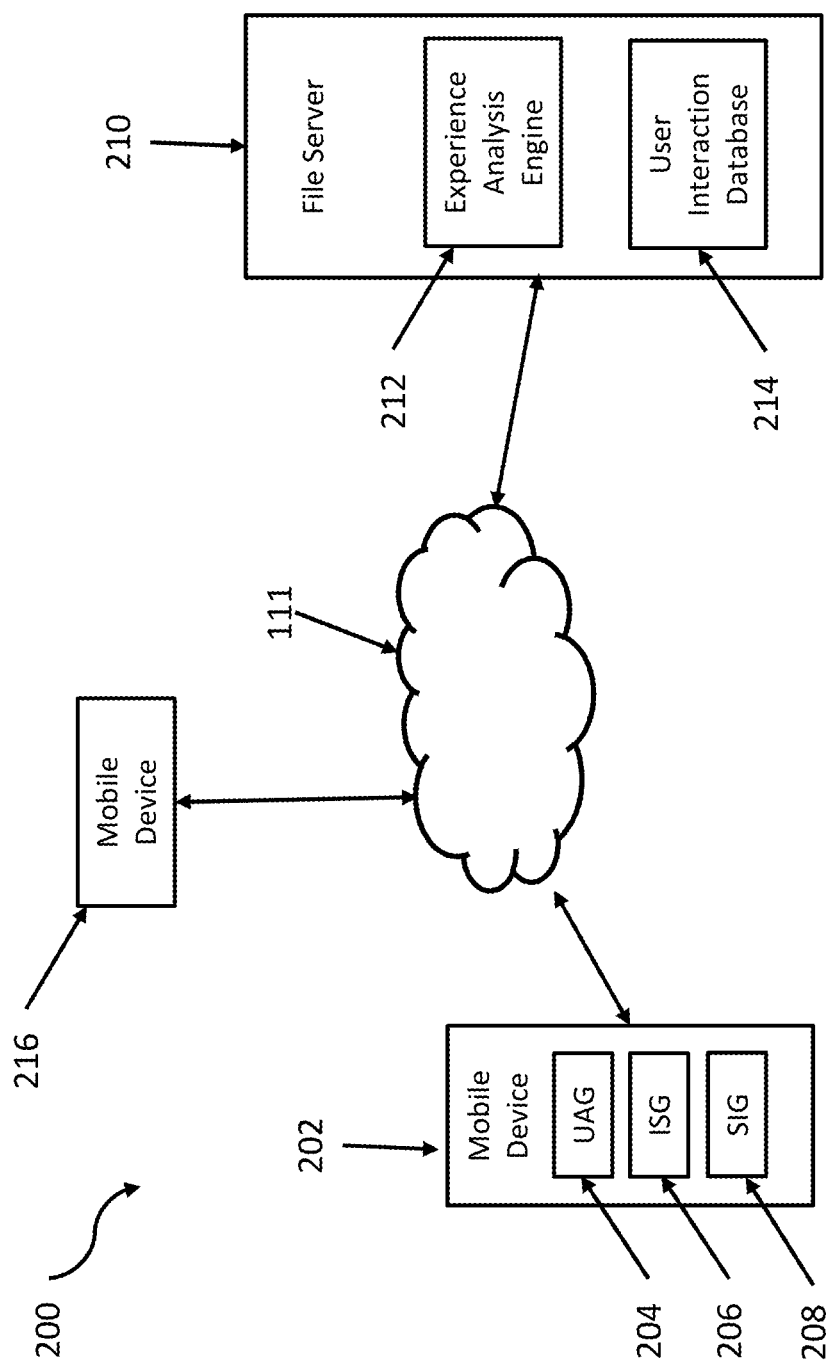
FIG. 2 depicts a computing environment for diagnosing an unfavorable mobile application user experience in accordance with an exemplary embodiment.

Referring now to FIG. 2, a computing environment 200 for diagnosing an unfavorable mobile application user experience is depicted, in accordance with an exemplary embodiment. Computing environment 200 may include at least one mobile device 202 operatively connected to at least one remote file server 210 through a network 111. Network 111 may be a mobile network, (e.g. GSM, FDMA, CDMA, etc.), the Internet, and/or any other suitable communication network. Computing environment 200 may also include a plurality of other mobile devices 216, which may also be in communication with remote file server 210.

Mobile device 202 may include a custom program saved within its memory comprising logic configured as a framework in which mobile device 202 may communicate with file server 210 via a middleware infrastructure (not depicted), an application server, (e.g., or remote file server 210) or some other method. In some embodiments, the framework may include one or more programs for monitoring installation of a mobile application, collection of user application interface information, and transmission of the information to remote file server 210. In some embodiments, the framework may be installed on mobile device 202 as a separate part of an installation of a mobile application.

According to some embodiments, the framework may include instruction means for collecting user application data. The user application data may include a plurality of data structures including, for example, a User Action Graph (UAG) 204, an Interface State Graph (ISG) 206, and/or a System Interaction Graph (SIG) 208. Mobile device 202 may be configured to collect user application interaction data in the form of UAG 204, ISG 206, and/or ISG 208, and transmit the user application interaction data to remote file server 210.

Remote file server 210 may include an experience analysis engine 212 implemented by one or more processors (e.g., processor 101). Experience analysis engine 212 may be configured to retrieve user application data from mobile device 202, inter-correlate the data, and update user interaction database 214 with the inter-correlated data. In some embodiments, file server 210 may retrieve user application data from a plurality of mobile devices (e.g., mobile device 202 and 216, etc.).

Figure 3:
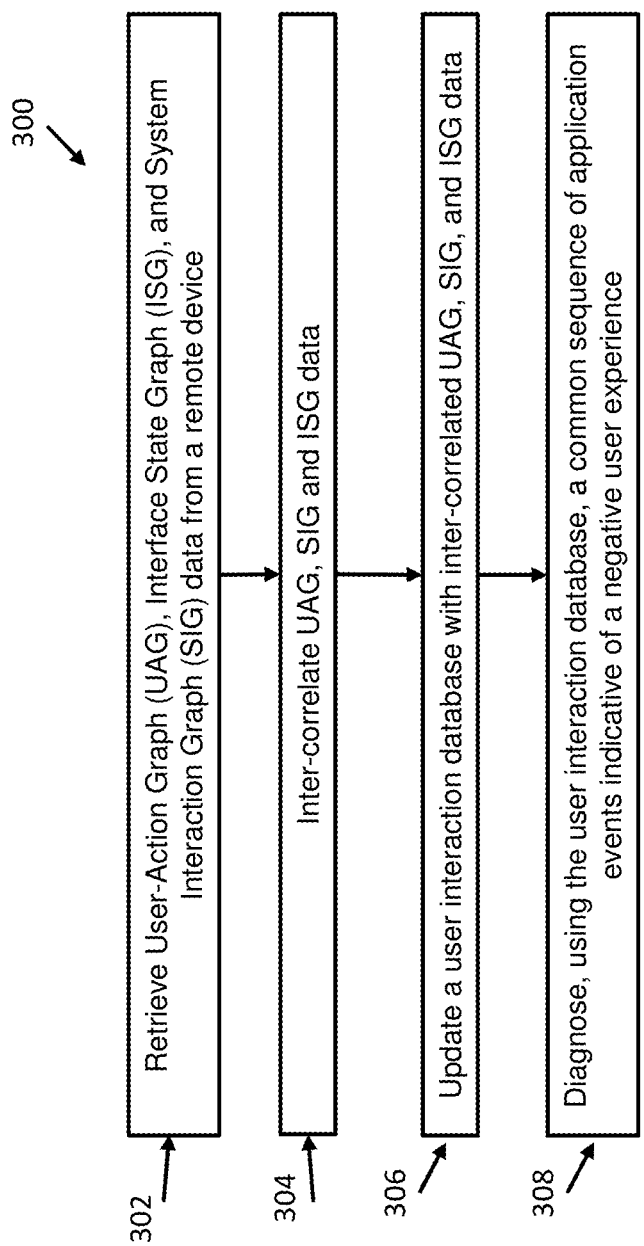
FIG. 3 depicts a flow diagram of a method for diagnosing an unfavorable mobile application user experience in accordance with an exemplary embodiment.

Referring now to FIG. 3, a flow diagram depicts a method 300 for diagnosing an unfavorable mobile application user experience, in accordance with an exemplary embodiment. In some aspects, user interaction database 214 may retrieve mobile application interaction data from mobile device 202, as shown at block 302. Experience analysis engine 212 may direct processor 101 to perform the analysis of the data. Mobile application interaction data may include a plurality of information in the form of graph information. For example, the application interaction data may include one or more User-Action Graphs (UAG) 204, one or more Interface State Graphs (ISG) 206, and/or one or more System Interaction Graphs (SIG) 208.

UAG 204 may include information indicative of a sequence of user interactions with a program operating on mobile device 202. FIG. 4A depicts a flow diagram of a User Action Graph (UAG) 400, in accordance with an exemplary embodiment. Referring briefly to FIG. 4A, UAG 400 may be configured to track and save information indicative of the ways in which a user (not shown) may interact with the mobile application. UAG 400 is depicted with actions 404 and 406. Although only two user actions are depicted on UAG 400, it is contemplated that an exemplary graph may contain a record of many user actions (e.g., 50, 100, etc.). For example, state 404 depicts action 404, which may be any user action on the mobile device. UAG 400 may indicate that a user performed a "Tap to Open" actions on the program (action 404), then performed action 406 (a Tap on Settings Tab) action. It is contemplated that actions saved as part of UAG 400 may include any of a multitude of program interactions (e.g., tapping a settings link, sliding a control, resizing a window, etc.).

Figure 4B:
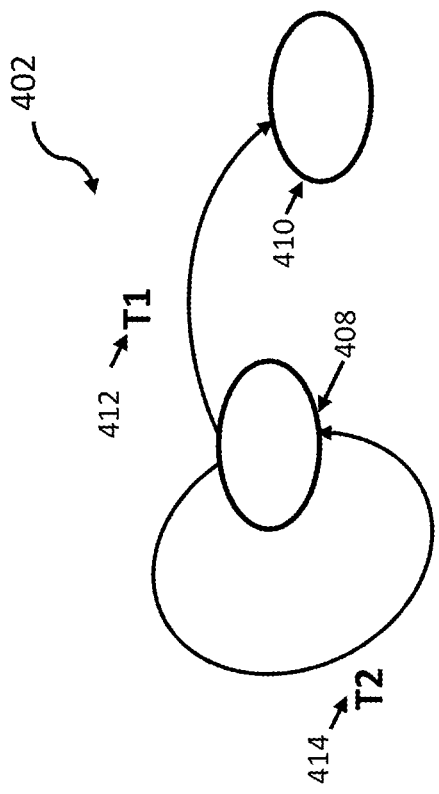
FIG. 4B depicts a flow diagram of a an Interface State Graph (ISG) in accordance with an exemplary embodiment.
Figure 4A:
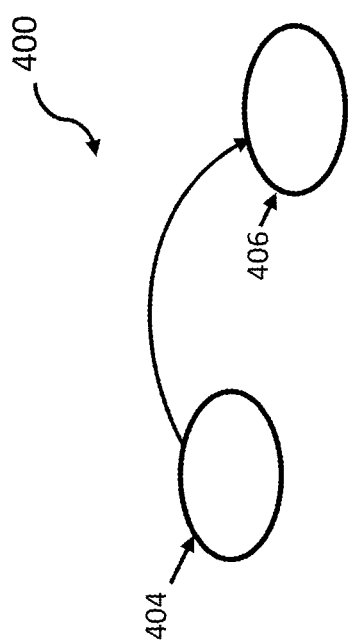
FIG. 4A depicts a flow diagram of a User Action Graph (UAG) in accordance with an exemplary embodiment.

FIG. 4B depicts a flow diagram of an Interface State Graph (ISG) 402, in accordance with an exemplary embodiment. An ISG may depict how a user traverses through different user interface (UI) pages of the app. For example, FIG. 4B depicts two states 408 and 410. States 408 and 410 represent two possible states of the program, e.g., Home 408, and Settings 410. States 408 and 410 may correlate to the actions 404 and 406, respectively, from UAG 400. For example a tap to open the program (as depicted in FIG. 4A as action 404) may trigger a transition 412 (T1), which may record the transition from Home state 408 to Settings state 410. Stated in another way, each transition (e.g., transition 412 (T1)) may correspond to a transition from one state to another in UAG 402. Transition 414 (T2) depicts a tap from the Home state 408, where the tap triggers a bug in the program. Where the user may have intended to transition to the Settings state (410), transition 414 may remain on the Home page. As depicted in FIG. 4B, ISG 402 may record information indicative that transition 414 looped back to the originating state 408 due to a programming bug.

In some aspects, ISG 402 may record each state and corresponding transition between each respective state. For example, ISG 402 may correlate directly with actions 404 and 406 depicted in FIG. 4A, which may exist as a distinct and separate data structure from ISG 402.

Figure 5:
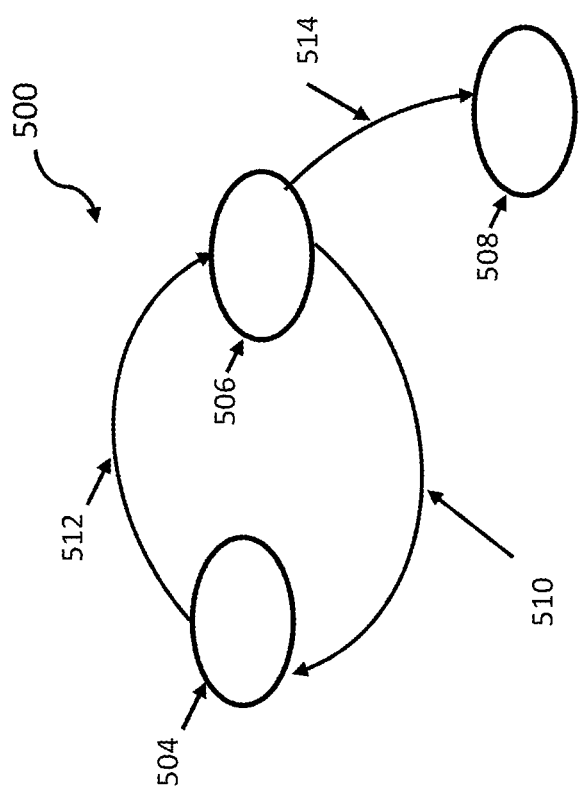
FIG. 5 depicts a flow diagram of a System Interaction Graph (SIG) in accordance with an exemplary embodiment.

FIG. 5A depicts a flow diagram of a System Interaction Graph (SIG) 500, in accordance with an exemplary embodiment. In some aspects, an SIG may depict how the mobile application handles internal process and interacts with the operating system of the mobile device during a corresponding state recorded in the UAG. The recorded states (e.g., states 504, 506 and 508) and transitions (e.g., 510, 512, and 514) of an SIG may follow the specific algorithmic/implementation details of how a mobile app is written. For example a user-selected action of selecting a "Share" link in a user interface could lead to a sequence of events that may include: (i) opening a secured tunnel to a remote social media network server, (ii) waiting for authentication, receiving authentication, and (iii) posting a REST (Representational State Transfer) application programming interface to include the local content on the remote server. Accordingly, a UAG may record information indicative of all of the interactive steps between software and hardware.

SIG 500 depicts the states and transitions for an action "Tap Open". Accordingly to some embodiments, the underlying program states may change upon execution of an action. For example, an action "Tap Open" (e.g., action 404 from FIG. 4) may cause SIG 500 to record "Home" state 504, which may indicate hardware actions associated with state 504. Transition 512 may indicate calls and responses to the operating system of mobile device 202 as the program transitions to state 506, where the page may open. Transition 510 may be indicative a transition back to the home state 504. In another aspect, state 508 may record information indicative of a system glitch (e.g., device 202 may shut down after state 506 due to a software/hardware interaction problem with the architecture of a particular device 202). Accordingly, SIG 500 may record information indicative of the software and hardware interactions during transition 514 prior to the shut-down state 508.

After considering exemplary graphs UAG 204, ISG 206, and SIG 208, we will now refer again to FIG. 3 depicting the flow diagram of method 300 for diagnosing an unfavorable mobile application user experience. After retrieving UAG 204, ISG 206 and SIG 208 from a plurality of remote devices (e.g., devices 202, 216, etc.), as seen in block 304, experience analysis engine 212 (hereafter "analysis engine 212") may inter-correlate information from all three graphs for the plurality of devices. The inter-correlated information may relate to user application interaction data on each respective mobile device compiled during a predetermined period of time. For example, analysis engine 212 may collect data from the previous three hours from all of the operatively connected devices (202 and 216).

As a preliminary step to inter-correlation, analysis engine 212 may parse each of the graphs retrieved from the mobile devices to determine whether a common error state exists in the information. For example, if the common programming shared between each of the plurality of mobile devices contains a programming error, some devices may be affected while others may not, due in part to the differences in hardware architectures. For each state in UAG 204, analysis engine 212 may refer to one or more lookup tables having every possible valid state of ISG that is reachable from any given node in the program. According to some embodiments, the lookup tables may contain static information in connection with the core programming of each subject program such that every possible state is represented and correlated with every possible connecting state. For example, if analysis engine 212 determines that four users experienced a system crash at or near a certain logical state, analysis engine 212 may reference the lookup table to determine whether one or more of the previously encountered states were invalid.

As shown in block 306, analysis engine 212 may update the user interaction database with inter-correlated UAG, SIG, and ISG data. The update may include inter-correlated graph data that can be used by analysis engine 212 to further diagnose events indicative of a negative user experience by users of the subject application.

In some aspects, analysis engine 212 may determine, based on the one or more lookup tables, if each represented state in the user application interaction data is a valid state. Accordingly, as shown at block 308, analysis engine 212 may diagnose, using the interaction database, a common sequence of application events indicative of negative user experience. According to some embodiments analysis engine 212 may preemptively flag a programming error before a large body of users become affected by a programming error. In some aspects, analysis engine 212 may preemptively determine errors to avoid negative user experiences. Accordingly, if analysis engine 212 determines that there is a common set of successive actions shared across multiple mobile devices resulting in software faults, analysis engine 212 may investigate the ISGs and SIGs generated by that particular sequence. For example, If user 1 moved to a Settings page after a "Tap Open" action, while user 2 remained in the home page after a similar "Tap Open" action, analysis engine 212 may investigate further by cross-correlating preceding actions, states, and transitions from graphs UAG 204, ISG 206, and SIG 208. More particularly, analysis engine may look up SIGs 208 for each of the plurality of devices experiencing an error to determine how internal states of the app evolved over course of time. For example, if an app is functionally behaving well but just slow to respond, UAG and ISG level diagnostics may not be sufficient. On the other hand, looking at SIGs might help by measuring the time spent in each state and by finding the program flow bottlenecks.

According to some embodiments, when analysis engine 212 identifies one or more common workflows that result in users uninstalling the application (or other negative event), analysis engine 212 may flag the event. The event can be handled on existing development process channels such as creation of a defect report, sending an email etc., to alert appropriate individuals who may give attention to the issue.

Figure 6:
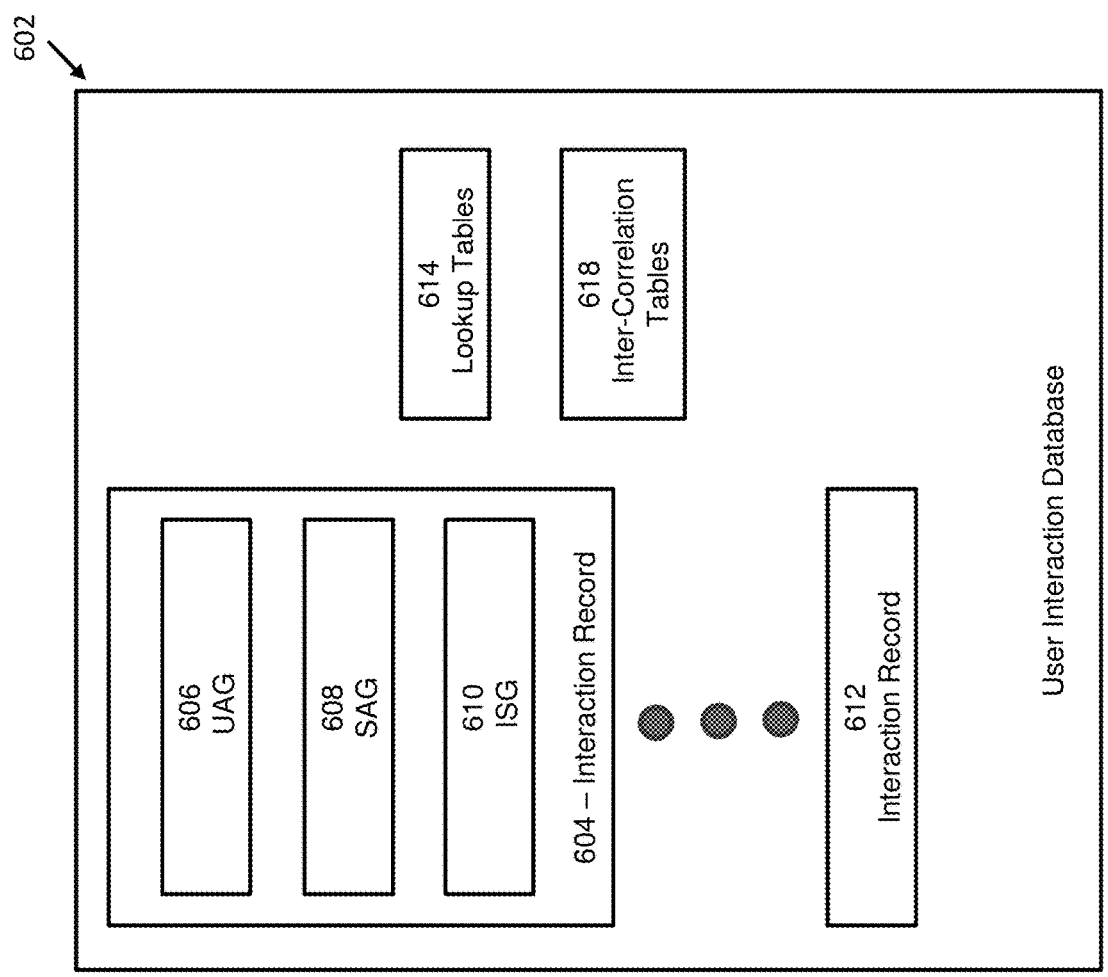
FIG. 6 depicts a block diagram of a user interaction database in accordance with an exemplary embodiment.

FIG. 6 depicts an exemplary user interaction database 602 (hereafter "database 602"), according to some embodiments. Database 602 may include interaction record 604 and 612, one or more lookup tables 614, and one or more inter-correlation tables 618. Although two records 604 and 612 are depicted, database 602 may contain any number of interaction records corresponding to user application interactions on many mobile devices.

Interaction record 604 may include a plurality of data structures including UAG 606, SAG 608, and ISG 610. Each of graphs 606, 608, and 610 may be related to a single user, and/or a single application session. For example, interaction record 604 may have information from a 10 minute application session from user 1.

Inter-correlation tables 618 may include inter-correlated user application interaction data from a plurality of users during a plurality of time periods. For example, analysis engine 212 may examine records for the last three hours from all users of the application. In another embodiment, analysis engine 212 may look at information from several days or weeks of application usage, but only from a subset of devices (identified, e.g., by device manufacturer or operating system). Lookup tables 614 may contain valid state information as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for diagnosing an unfavorable mobile application user experience comprising: retrieving user application interaction data from a plurality of mobile devices; inter-correlating the user application interaction data using one or more lookup tables containing static information in connection with the core programming of each subject program such that every possible state is represented and correlated with every possible connecting state in the one or more lookup tables; determining if states in the user application interaction data are valid states, wherein information indicating the valid states are included in the one or more lookup tables, wherein the user application data comprises a System Interaction Graph (SIG) indicative of interactions between mobile devices and mobile device applications, wherein the SIG indicates time spent in each state; updating a user interaction database with the inter-correlated user application data; diagnosing, via a processor operatively connected to the user interaction database, information indicative of a cause of the unfavorable user experience; identifying a common sequence of application events based on the user interaction data from the plurality of mobile devices, wherein the common sequence of application events is a common set of successive actions shared across the plurality of mobile devices resulting in software faults; and when the common sequence of application events result in an error, performing a lookup to respective SIGs for each of the plurality of mobile devices experiencing the error to determine how internal states of the mobile application has evolved over time, and preemptively flagging the error prior to other mobile devices becoming affected by the error.

2. The computer-implemented method of claim 1, wherein the information comprises a sequence of events indicative of a user's interaction with an application on the mobile device.

3. The computer-implemented method of claim 1, wherein the user application data comprises a User-Action Graph (UAG) indicative of a sequence of user interactions with a mobile device application.

4. The computer-implemented method of claim 1, wherein the user application data comprises an Interface State Graph (SG) indicative of a sequence of interface states of a mobile device application.

5. A system for diagnosing an unfavorable mobile application user experience comprising: a processor configured to: retrieve user application interaction data from a plurality of mobile devices; inter-correlate the user application interaction data using one or more lookup tables containing static information in connection with the core programming of each subject program such that every possible state is represented and correlated with every possible connecting state in the one or more lookup tables, wherein the inter-correlated user application interaction data Is compiled during a predetermined period of time for the plurality of mobile devices; determine if states in the user application interaction data are valid states, wherein information indicating the valid states are included in the one or more lookup tables, wherein the user application data comprises a System Interaction Graph (SIG) indicative of interactions between mobile devices and mobile device applications, wherein the SIG indicates time spent in each state; update a user interaction database with the inter-correlated user application data; diagnose information indicative of a cause of the unfavorable user experience; identify a common sequence of application events based on the user interaction data from the plurality of mobile devices, wherein the common sequence of application events is a common set of successive actions shared across the plurality of mobile devices resulting in software faults; and when the common sequence of application events result in an error, perform a lookup to respective SIGs for each of the plurality of mobile devices experiencing the error to determine how internal states of the mobile application has evolved over time, and preemptively flag the error prior to other mobile devices becoming affected by the error.

6. The system of claim 5, wherein the information comprises a sequence of events indicative of a users interaction with an application on the mobile device.

7. The system of claim 5, wherein the user application data comprises a User-Action Graph (UAG) indicative of a sequence of user interactions with a mobile device application.

8. The system of claim 5, wherein the user application data comprises an Interface State Graph (ISG) indicative of a sequence of interface states of a mobile device application.

9. A non-transitory computer-readable medium storing instructions executable by a processor to perform a method, the method comprising: retrieving user application interaction data from a plurality of mobile devices; inter-correlating the user application interaction data using one or more lookup tables containing static information in connection with the core programming of each subject program such that every possible state is represented and correlated with every possible connecting state in the one or more lookup tables; determining if states in the user application interaction data are valid states, wherein information indicating the valid states are included in the one or more lookup tables, wherein the user application data comprises a System Interaction Graph (SIG) indicative of interactions between mobile devices and mobile device applications; wherein the SIG indicates time spent in each state; updating a user interaction database with the inter-correlated user application data; diagnosing, via a processor operatively connected to the user interaction database, information indicative of a cause of the unfavorable user experience; identifying a common sequence of application events based on the plurality of user interaction data from the plurality of mobile devices, wherein the common sequence of application events is a common set of successive actions shared across the plurality of mobile devices resulting in software faults; and when the common sequence of application events result in an error, performing a lookup to respective SIGs for each of the plurality of mobile devices experiencing the error to determine how internal states of the mobile application has evolved over time, and preemptively flagging the error prior to other mobile devices becoming affected by the error.

10. The non-transitory computer-readable medium of claim 9, wherein the information comprises a sequence of events indicative of a user's interaction with an application on the mobile device.

11. The non-transitory computer-readable medium of claim 9, wherein the user application data comprises a User-Action Graph (UAG) indicative of a sequence of user interactions with a mobile device application.

12. The non-transitory computes readable medium of claim 9, wherein the user application data comprises an Interface State Graph (ISG) indicative of a sequence of interface states of a mobile device application.

* * * * *